United States Patent
Patrick et al.

(10) Patent No.: US 9,566,644 B2
(45) Date of Patent: Feb. 14, 2017

(54) ALUMINUM-STAINLESS STEEL CONDUCTOR (THIRD) RAIL AND METHOD

(71) Applicants: Edward P. Patrick, Murrysville, PA (US); Dan Popescu, Scottsdale, AZ (US)

(72) Inventors: Edward P. Patrick, Murrysville, PA (US); Dan Popescu, Scottsdale, AZ (US)

(*) Notice: Subject to any disclaimer, the term of this patent is extended or adjusted under 35 U.S.C. 154(b) by 0 days.

(21) Appl. No.: 14/940,972

(22) Filed: Nov. 13, 2015

(65) Prior Publication Data

US 2016/0361762 A1    Dec. 15, 2016

Related U.S. Application Data

(63) Continuation of application No. 14/736,199, filed on Jun. 10, 2015, now abandoned.

(51) Int. Cl.
| | |
|---|---|
| *B22D 19/00* | (2006.01) |
| *B22D 19/04* | (2006.01) |
| *B22D 25/02* | (2006.01) |
| *B22D 21/00* | (2006.01) |
| *C22C 21/00* | (2006.01) |
| *E01B 5/14* | (2006.01) |
| *E01B 5/08* | (2006.01) |

(52) U.S. Cl.
CPC ............. *B22D 19/04* (2013.01); *B22D 21/007* (2013.01); *B22D 25/02* (2013.01); *C22C 21/00* (2013.01); *E01B 5/08* (2013.01); *E01B 5/14* (2013.01)

(58) Field of Classification Search
CPC ............. B60M 1/30; B60M 1/302; B60M 5/00; B61C 23/24; E01B 5/08; H01B 1/023
See application file for complete search history.

(56) References Cited

U.S. PATENT DOCUMENTS

| | | | | |
|---|---|---|---|---|
| 4,215,560 A | * | 8/1980 | Ames .................... | B21C 23/22 72/258 |
| 5,061,829 A | * | 10/1991 | Mier .................... | B21C 23/24 191/22 DM |
| 5,279,397 A | * | 1/1994 | Hartland ................ | B60M 1/302 191/22 DM |
| 5,310,032 A | * | 5/1994 | Plichta .................. | B60M 1/302 191/22 DM |
| 2013/0098726 A1 | * | 4/2013 | Ciloglu ................. | B60M 1/302 191/29 DM |

* cited by examiner

*Primary Examiner* — Jason C Smith
(74) *Attorney, Agent, or Firm* — Gary P. Topolosky

(57) ABSTRACT

A method of manufacturing an aluminum power transmission rail product with a metallurgically bonded stainless steel cap comprises providing molten aluminum in a tundish; providing a roll formed stainless steel wear cap; pretreating and preheating the stainless steel cap, then introducing that cap into the tundish; co-casting the aluminum and cap through one or more dies; and tensioning the stainless steel cap at an exit of the casting die and rapidly cooling the same. An aluminum-stainless composite product is also disclosed.

10 Claims, 2 Drawing Sheets

ALUMINUM-STAINLESS STEEL CONDUCTOR (THIRD) RAIL AND METHOD

CROSS-REFERENCE TO RELATED APPLICATIONS

This is a continuation of U.S. application Ser. No. 14/736,199, filed on Jun. 10, 2015, which was a perfection of Provisional Application No. 62/010,039, filed on Jun. 10, 2014, both disclosures of which are fully incorporated by reference herein.

FIELD OF THE INVENTION

This invention relates to the manufacture of conductor power or third rails for trains, subways, cranes and other electrically powered mobile vehicles. These are the power transmission rails used in mass transit systems such as subways, regional trains, airports, expo complexes, and entertainment park "people movers". These same power transmission rails are also used with container port cranes and warehouse linear transport systems. The invention further relates to an improved method for making an aluminum-stainless steel alternative to existing electrical conduction rail products.

Presently, all but one version of aluminum—stainless steel composite third rail designs utilize an extruded aluminum component onto which a stainless steel wear cap is mechanically attached. The single exception involves co-extruding aluminum and a stainless steel strip to produce a metallurgically-bonded product. This invention is based on directly producing a power transmission rail shape from a molten or semi-solid metal stream and achieving a metallurgical bond with a stainless steel wear cap which results in savings in capital, energy, and time.

BACKGROUND OF THE INVENTION

There are already several known Al products, made by known means. Representative of the art include the following disclosures, in chronological order:

Hillmann U.S. Pat. No. 3,850,271 showed a third (or live) rail having a longitudinally extending T-shaped slot that holds a folded sheet section. The product is intended for larger current and high-speed applications.

The high conductivity rail of Corl et al. U.S. Pat. No. 3,885,655 shows a hollow aluminum shell onto which is fastened a stainless steel cap for abrasion resistance.

Plichta U.S. Pat. No. 5,263,561 disclosed a power conductor rail made from asymmetrically shaped steel onto which is applied an aluminum cladding layer.

A metal capped I-beam is the subject of Chinese Published Application No. 201736838 (from 2011).

Most recently, there was a friction stir welded variety of Al conductor rail shell disclosed in Ciloglu et al. Published U.S. Application No. 2013/0098726.

SUMMARY OF THE INVENTION

This invention provides an improved method for making an Al-stainless steel (SS) product that exploits the benefits of aluminum manufacturing while further achieving enhanced performance through the selection of preferred alloy combinations. Manufacturing/production costs may be further enhanced depending on the degree to which recycled materials may be blended therein.

One key advantage for having the stainless steel cap as a co-casting element is that it maintains high strength at the aluminum casting temperature. Another advantage is that it affords a means of assisting/increasing conventional horizontal casting rate. It would act in much the same way as a fiber reinforcement in a pultrusion. For that variation, the horizontal casting speed would be determined by the metal feeding and cooling capacities.

The method described herein will provide support to the solidifying aluminum and a means of applying tension to pull the casting at a significantly higher rate. In fact, this approach could be used to increase the casting rate of conventional horizontal casting by using a stainless steel "belt" (or other similar continuous element) that may be pre-oxidized to prevent bonding, yet provides support and means of pulling the semi-solid casting through the casting die. In the latter case, the stainless steel element could be a continuous belt.

BRIEF DESCRIPTION OF THE DRAWINGS

Further features, objectives and advantages will be made clearer from the following detailed description made with reference to the accompanying drawings in which.

DESCRIPTION OF PREFERRED EMBODIMENTS

Figure 1:
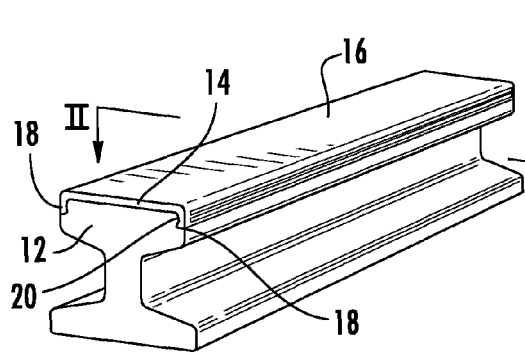
FIG. 1 is a perspective view of one Al-stainless product (or "stick") that can be manufactured by one embodiment of the present invention.

This invention discloses a technological, productivity and cost-game changer for an increasingly competitive mass transit market. Several factors that will drive the new conductor rail design of this invention include: (i) innovation as a competitive advantage in a market crowded by welded design copycats; (ii) a relatively low investment required for duplicating in various country manufacturing facilities; (iii) superior electrical conductivity due to metallurgical bonding; (iv) metallurgical bonding attachment at a lower cost than a co-extruded design; (v) better long term reliability/corrosion resistance due to metallurgical bonding; (vi) greater flexibility in stainless steel thickness and profile; and (vii) a truly continuous process that minimizes starts, stops and end cropping steps.

Overall cost reduction opportunities include: eliminating the cost premium, lead time, and inventory cost of an extruded profile; a single step from molten metal-to-product profile, optimizing the alloy for cost and performance by taking advantage of THE low-resistance metallurgical bond; adding flexibility to design alloy compositions/conductivity of specific rail profiles (4500A, 6000A); and enhancing productivity (doubling or possibly tripling same) by producing 4 to 6 rails or "sticks" at a time.

Metallurgical Bonding—

This invention will use a new and useful method for achieving this metallurgical bond. One embodiment requires uniform application of a fluoride salt flux prior to combining the continuous wear strip and aluminum to form the composite rail. Another option is to apply a metal bond coating consisting of: either Ni, Zn, Al or their alloys onto the wear strip prior to forming the composite structure. Through such methods, the rate/amount of intermetallic growth at the Al/stainless steel (SS) interface can be controlled. Third rail conductivity will be a function of SS & Al cross sections, the nature of the bond at the SS/Al interface, and the Al alloy composition used for the same.

One embodiment of this invention will use a continuously cast rail consisting of a SS roll formed cap, preferably having locking features on down-standing flanges. There will be metallurgical bonding between the aluminum-stainless interface along with locking features (like a down-turned cap) for failsafe redundancy. The underlying aluminum conducting rail can be made using custom secondary aluminum alloys or compositions optimized for conductivity, cost and mechanical properties processed via a horizontal caster, horizontal DC, MDC caster or semi-solid caster.

Casting rate improvements over conventional continuous horizontal or vertical methods are expected. In conventional continuous casting, rate is controlled by varying the hydraulic head of molten metal. This invention offers the additional advantage of increased casting speed similar to "pultrusion" as the steel cap strip affords the ability to exert a tension force without the limitation of solidifying metal coherency. Additional cooling capacity is required.

By making the main product via continuous casting, significant savings in fabrication energy will be accrued by eliminating the numerous thermal and fabrication process steps required by current aluminum-stainless steel power transmission rail fabrication methods.

Presently, a typical aluminum/SS composite power rail is fabricated by extruding an aluminum rail with a length of roll formed stainless steel cap, or by mechanically affixing a roll formed stainless steel cap to a 15 meter length of extruded aluminum rail profile. Sub-steps include: (1) taking primary ingot as purchased from the LME; (2) re-melting to form a cast extrusion billet; (3) scalping that billet; (4) roll forming the SS cap components; (5) extruding a rail section with selective grooves; (6) assembling the stainless steel cap components onto the aluminum extrusion and welding along one or more seams; (7) mill welding reinforcement if on centerline(s); and finally, (8) cutting to final "stick" length.

Per the invention, composite metallurgically-bonded aluminum/SS power rail would be a continuous process going from molten or semi-solid metal in conjunction with a continuously roll formed SS cap to a rail shaped product. The sub-steps for this method include: (a) taking an ingot (preferably, purchased from the LME); (b) re-melting and feeding to a tundish; (c) co-casting it with a roll formed, SS cap; (d) cooling the emerging aluminum/SS composite; (e) roll straightening/sizing (possibly re-shaping) as required; and (f) cutting it to length.

In a preferred embodiment, this method concludes by providing the tensioned cast product with copious quantities of a cooling medium, preferably water. By "copious", it is meant that sufficient quantities of cooling medium are applied to achieve solidification of the emerging aluminum cast component.

Figure 5:
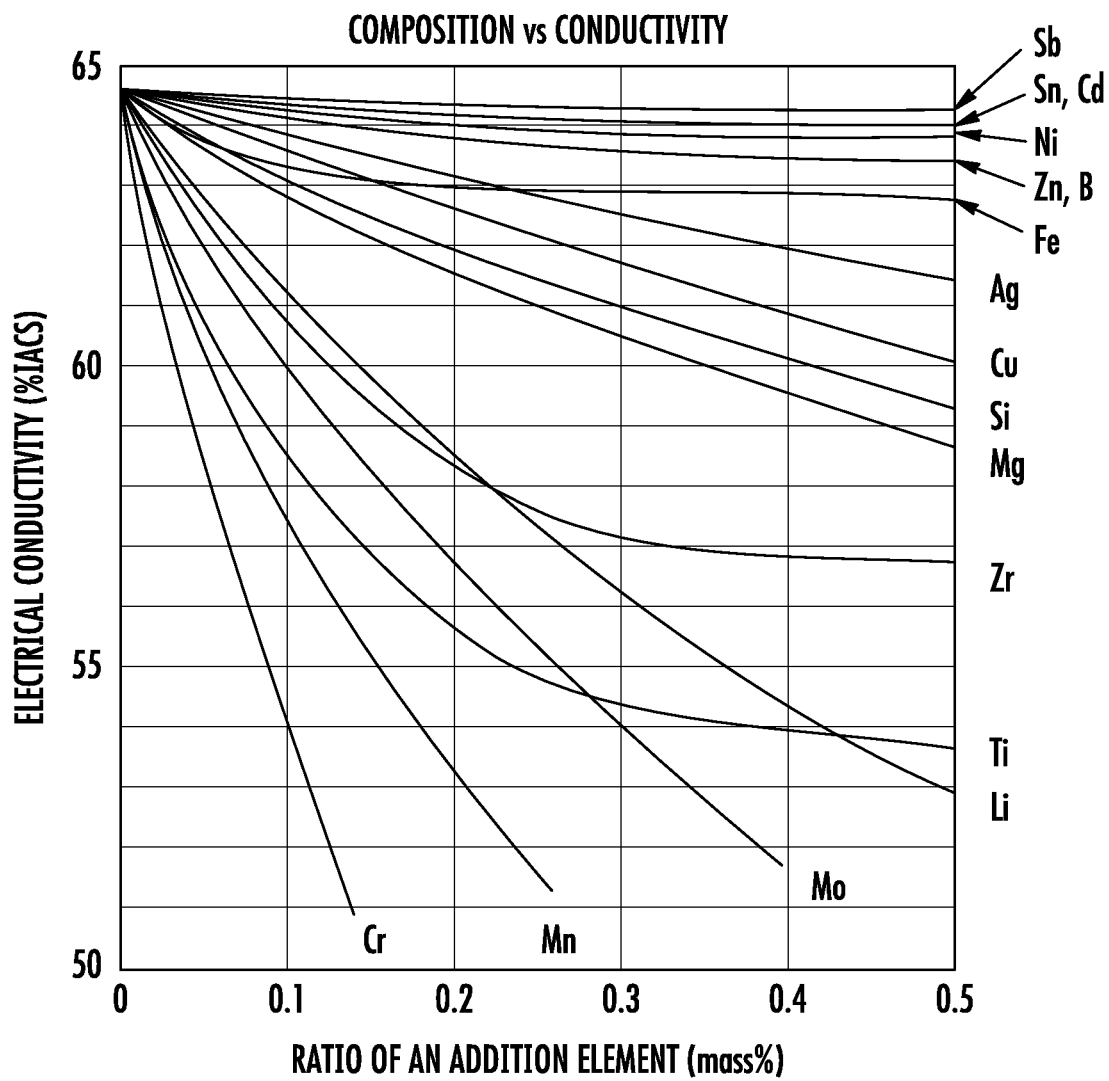
FIG. 5 is a graphic depiction of electrical conductivity (as % IACS) versus various additional elements (in mass %) as a tool for optimizing alloy component selection per the present invention.

When bringing in the possibility, actually greater likelihood, of using recycled aluminum feedstock, even greater improvements should be realized through the methods of this invention. Note, particularly, the effects of using primary vs. recycled aluminum:

Primary metal—smelter output alloyed to specification
Recycled metal—segregated scrap—same/similar alloys—mixed scrap—undefined composition In addition to the basic concept of making a composite Al/SS power transmission rail for rapid transit and other electrified rail devices, e.g., cranes, etc., this invention exploits using aluminum from other than virgin metal streams, i.e., recycling, foundry scrap, and metal at the low value end of a recycling stream that contains excess impurities, e.g., Fe, Mn, Zn, Ni, etc. The graph at FIG. 5 shows the effects of these elements up to about 0.5 wt %. For elements Fe, Zn, B, Ni, Sn, Cd and Sb, the trend appears to be fairly flat. Therefore, it is reasonable to assume much higher levels of these elements can be present without significant reduction to conductivity. Preferably, the Mn levels in such recycled product is purposefully reduced or eliminated altogether.

Besides the immediate benefit to efficient energy distribution and cost savings on infrastructure (particularly for new "product" installations, as compared to retrofits), there should be an environmental benefit (in the context of $CO_2$/GHG emissions) when the total life cycle of producing aluminum by extrusion is taken into account. That calculation would look significantly better herein with the anticipated increased use of recycled materials (especially when compared to standard aluminum extrusion processing). This improved process will also avoid the environmental impact of exporting energy in the form of scrap.

Significant attention on the energy transfer aspects of recycled aluminum must be factored in as it chases growth markets around the world. Accordingly, the energy conservation aspects of this approach will become increasingly important, particularly with regard to the US third rail (and related) markets.

Figure 2:
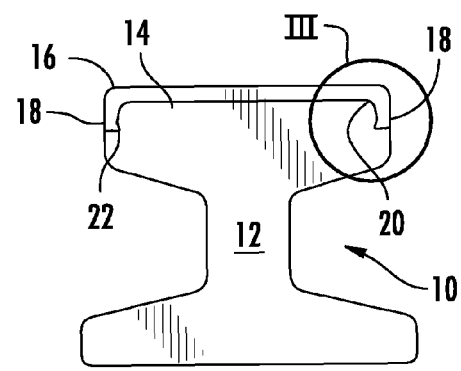
FIG. 2 is an enlarged cross-sectional view of the third rail stick taken along lines II-II in FIG. 1.
Figure 3:
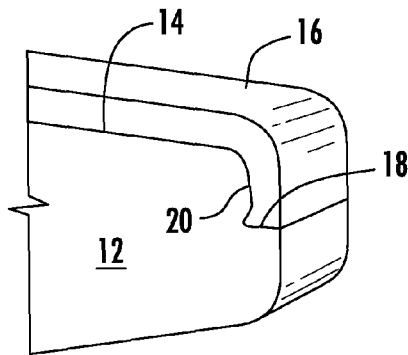
FIG. 3 is a close up perspective view through a section of the steel clad, Al third rail stick as taken from the circled section III in FIG. 2.

Referring now to the accompanying drawings, there is shown in FIGS. 1 through 3 a first embodiment of co-cast transmission rail product, generally 10 which resembles a profiled shape (in this case, an I-beam) in cross-section. That rail product includes a main body component 12 made from cast aluminum to which is metallurgically bonded at their interface 14 an upper cap 16 of stainless steel. As better seen in the close up views at FIGS. 2 and 3, this upper cap 16 may have at one or both edges 18 a locking member for further mechanically engaging with the uppermost outer edge 20 of the aluminum main body component 12. One such locking member would include a plurality of longitudinal slots on one or both down standing flanges. A representative set of such slots is shown as element L in FIG. 1. An alternative or supplemental locking member may include an inwardly extending toothed section as seen as element 22 on the left side of FIG. 2.

Figure 4:
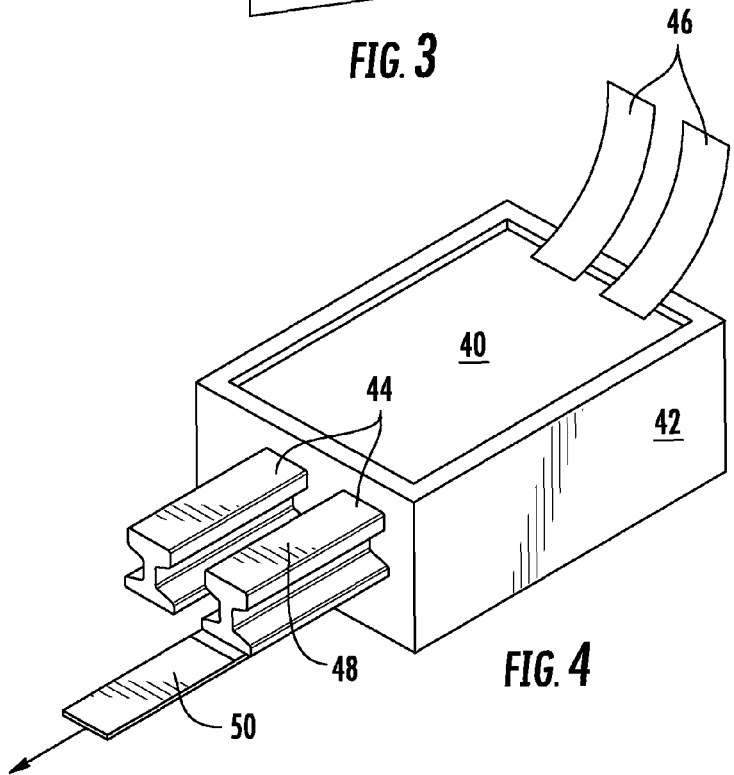
FIG. 4 is a top perspective view showing one embodiment of a method of rail manufacture according to this invention wherein a prepared, preheated stainless steel cap component is pulled into a molten aluminum bath for co-casting and adhering to the end product exiting the casting die in the shape of a power transmission rail.

FIG. 4 schematically illustrates one preferred method of composite product manufacture. Therein, a bath of molten aluminum 40, within tundish 42, is stored and heated with a plurality of casting dies 44 at one end. Into this bath, there is continuously fed a continuous strip 46 of stainless steel (actually, two are shown). At the forward end of tundish 42, this combination of cast aluminum product 48 has a cap 50 (shown on the underside) of stainless steel metallurgically formed therewith either by direct casting therewith, or via a pseudo-pultrusion like pulling of material through dies 44. Thereafter, the end product is doused with a cooling medium (not shown).

FIG. 5 is a graph depicting the effects of various aluminum alloy additives on conductivity. It is meant to underscore the possibility of using recycled scrap feedback rather than pure aluminum billet in subsequent variations of the present invention.

What is claimed is:

1. A method of manufacturing an aluminum power transmission rail product with a stainless steel cap metallurgically bonded thereto, said method comprising:
    (a) providing molten aluminum in a tundish;
    (b) providing a roll formed stainless steel wear cap;
    (c) pretreating and preheating the stainless steel cap, then introducing the stainless steel cap into the tundish;
    (d) co-casting through one or more casting dies molten aluminum from the tundish with the stainless steel cap; and
    (e) tensioning the stainless steel cap at an exit of the casting die and rapidly cooling the co-casting to produce the transmission rail product.

2. The method of claim 1 which further comprises:
    (f) roll straightening, sizing and/or shaping the transmission rail product; and
    (g) cutting the co-cast rail product to length.

3. The method of claim 1 wherein the molten aluminum is from a newly made feedstock.

4. The method of claim 1 wherein the molten aluminum is from a recycled feedstock that has been purified to reduce or remove its manganese content.

5. The method of claim 1 wherein the stainless steel cap has a locking feature.

6. The method of claim 5 wherein the locking feature includes a down-turn on at least one axial edge of the stainless steel cap.

7. The method of claim 6 wherein the locking feature includes a down-turn on both axial edges of the stainless steel cap.

8. The method of claim 1 wherein the stainless steel cap in step (b) is supplied as a continuous belt.

9. The method of claim 8 wherein the continuous belt is pre-oxidized.

10. The method of claim 1 wherein step (e) includes tensioning the stainless steel cap at an increased casting rate similar to a pultrusion.

* * * * *